(12) United States Patent
Foster et al.

(10) Patent No.: US 6,736,305 B2
(45) Date of Patent: May 18, 2004

(54) METHOD AND APPARATUS FOR FRICTION WELDING

(75) Inventors: Derek J Foster, Bristol (GB); Michael S Hodgson, Bristol (GB); Sandra J King, Bristol (GB)

(73) Assignee: Rolls-Royce plc, London (GB)

( * ) Notice: Subject to any disclaimer, the term of this patent is extended or adjusted under 35 U.S.C. 154(b) by 143 days.

(21) Appl. No.: 09/945,832

(22) Filed: Sep. 5, 2001

(65) Prior Publication Data

US 2002/0036225 A1 Mar. 28, 2002

(51) Int. Cl.[7] .......................... B23K 20/12; B23K 31/02
(52) U.S. Cl. .................... 228/113; 228/112.1; 228/114; 228/114.5; 228/2.1; 228/2.3; 219/617
(58) Field of Search ...................... 228/112.1, 113, 228/114, 119.5, 2.1, 2.3; 219/617

(56) References Cited

U.S. PATENT DOCUMENTS

| | | | | |
|---|---|---|---|---|
| 3,779,446 A | * | 12/1973 | Lemelson | 228/15.1 |
| 4,106,167 A | * | 8/1978 | Luc | 29/33 D |
| 4,375,997 A | * | 3/1983 | Matz | 148/570 |
| 4,734,552 A | * | 3/1988 | Brolin | 219/617 |
| 4,949,895 A | * | 8/1990 | Sugiyama et al. | 228/175 |
| 5,077,081 A | * | 12/1991 | Bedford | 228/2.3 |
| 5,240,167 A | * | 8/1993 | Ferte et al. | 219/611 |
| 5,262,123 A | * | 11/1993 | Thomas et al. | 419/67 |
| 6,007,301 A | * | 12/1999 | Noda et al. | 416/213 R |
| 6,168,067 B1 | * | 1/2001 | Waldron et al. | 228/112.1 |
| 6,172,320 B1 | * | 1/2001 | Krishnan et al. | 219/101 |
| 6,213,379 B1 | * | 4/2001 | Takeshita et al. | 228/112.1 |

FOREIGN PATENT DOCUMENTS

| | | |
|---|---|---|
| GB | 1111512 | 5/1968 |
| JP | 53-127348 A * | 11/1978 |
| JP | 03-234382 A * | 10/1991 |
| JP | A 10202373 | 8/1998 |
| JP | A 11226757 | 8/1999 |
| JP | A 11291067 | 10/1999 |
| WO | WO 99/39861 | 8/1999 |
| WO | WO 00/25973 | 5/2000 |

* cited by examiner

Primary Examiner—Lynne Edmondson
(74) Attorney, Agent, or Firm—Oliff & Berridge, PLC

(57) ABSTRACT

The present invention relates to rotary friction welding and non-rotary motion friction welding, providing means for controlling ductilities of the components during the welding process so as to bias the welding process in favor of a first component or to match the ductilities of different components thereby facilitating the welding process.

10 Claims, 5 Drawing Sheets

METHOD AND APPARATUS FOR FRICTION WELDING

The present invention relates to an improved method and associated apparatus for friction welding of components.

In particular the present invention relates to rotary friction welding and non-rotary motion friction welding, providing means for controlling ductilities of the components during the welding process so as to bias the welding process in favour of a first component or to match the ductilities of different components thereby facilitating the welding process.

Rotary friction welding and non-rotary motion friction welding are used to create solid state welds. By moving a first component relative to a second component, the interface between them is heated via friction. When the ductility of the materials are sufficiently reduced by this heating, the components are squeezed together, expelling material from the interface to form an upset and creating conditions suitable for a pressure weld to form.

Used correctly friction welding provides high integrity welds with low porosity and contamination. Furthermore, friction welding is a solid state process that does not melt but only softens the components being joined, permitting the joining of material combinations that cannot be otherwise welded and of joining cast materials that suffer degradation if recast.

However, as used hitherto the process has limitations. Up to now it has not been possible to join all material combinations, in particular where components to be joined are of widely disparate ductilities. For example attempts to join titanium aluminide component to a titanium component generally fail as the titanium aluminide component cannot be heated sufficiently by friction before the titanium component begins to melt.

A further limitation can be caused by the upset resulting from the friction welding process. Although the upset performs a useful role, removing contamination prior to weld formation, upset consumes material from both components being joined according to their ductility. Hence friction welding two similar components results in similar material loss from each and conversely when welding materials of different ductility, the upset consumes more material from the softer component, the change in geometry associated with both the material consumed and the upset itself mean that the process is not suitable to repair of geometry-critical components.

The present invention seeks to provide control of component ductilities and thereby provide an improved friction welding process to overcome the above limitations. Furthermore it enables the friction welding process to be biased to consume more material from a less critical component regardless of the relative ductilities of the components being joined.

According to one aspect of the present invention there is provided friction welding apparatus for friction welding a first component and a second component together, the first component having a first weld face, the second component having a second weld face, the apparatus comprising means for bringing together the first weld face of the first component and the second weld face of the second component under a load to form a weld interface, means for simultaneously moving at least one of the components relative to the other to generate frictional heat at the weld interface, and cooling means to control temperatures in the first component adjacent the first weld face in order to control ductility of the first component adjacent the weld interface.

According to a further aspect of the present invention such apparatus is provided with heating means to increase temperatures in the second component adjacent the second weld face thereby controlling ductility of the second component adjacent the interface.

According to another aspect of the present invention there is provided a method of friction welding a first component and a second component together, the first component having a first weld face, the second component having a second weld face, comprising the steps of bringing together the first weld face of the first component and second weld face of the second component under a load to form a weld interface, simultaneously moving at least one of the components relative to the other to generate frictional heat at the weld interface, and cooling the first component adjacent the first weld face thereby controlling the ductility of the first component adjacent the weld interface.

According to a further aspect of the present invention, there is provided such a method of friction welding wherein the second component is heated adjacent the second weld face thereby controlling the ductility of the second component adjacent the weld interface.

The invention and how it may be carried out in practise will now be described in more detail with reference to the accompanying drawings in which:

An inertia friction welding machine is described to illustrate the invention however, this is for example only and is not meant to limit the application of the invention exclusively to such machines. It will be understood that the invention is equally suitable to other rotary friction welding machines such as continuous drive rotary friction welding and to non-rotary motion friction welding such as linear friction welding machines.

Figure 1:
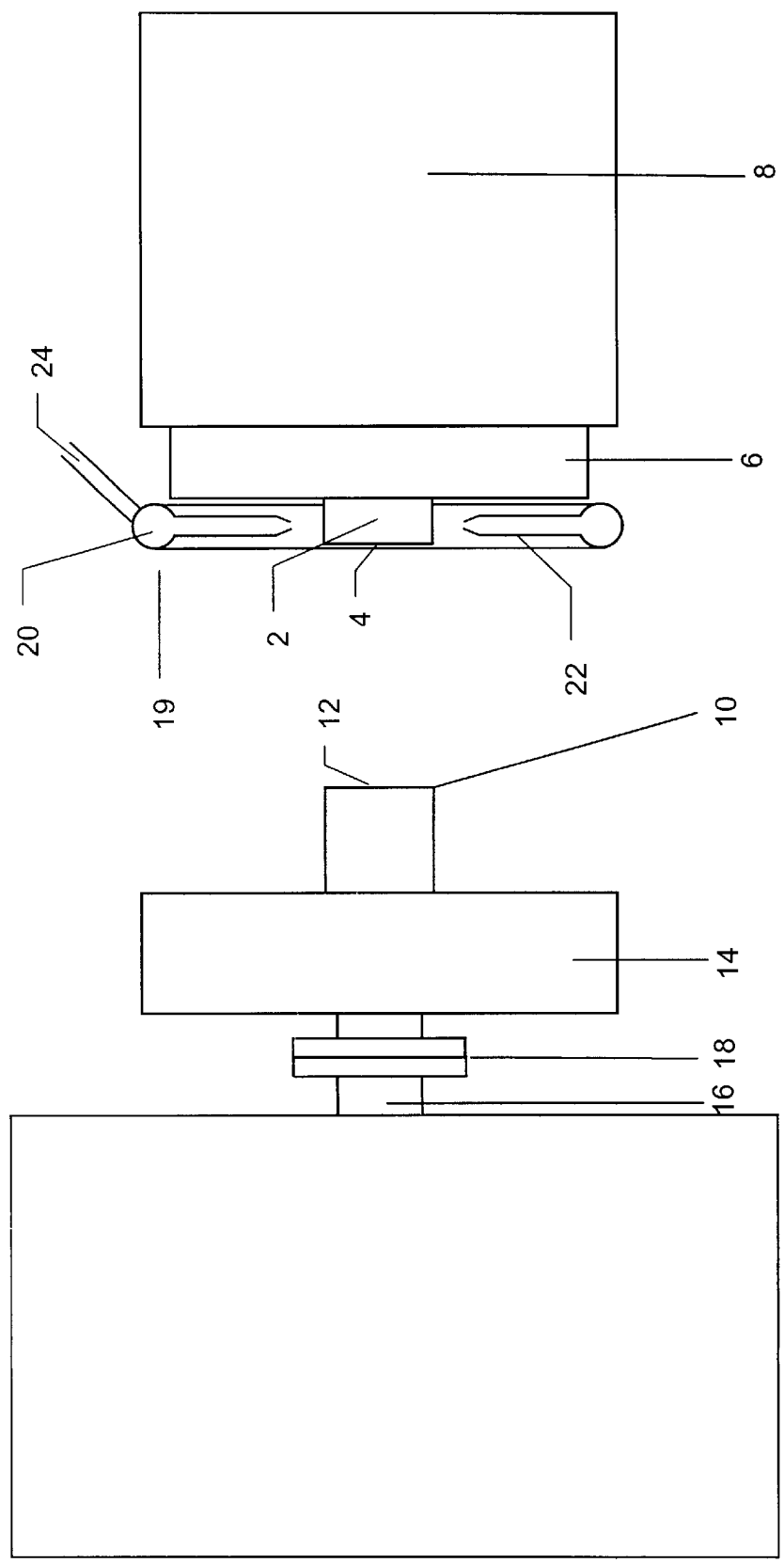
FIG. 1 shows a schematic of an inertia friction welding device modified according to a first aspect of the present invention.

Referring now to the drawings, FIG. 1 shows a schematic of a friction welding apparatus modified according to a first aspect of the present invention. A first component 2 of titanium with a first weld face 4 is held in a clamp 6 mounted on a hydraulic ram 8. A second component 10 of titanium aluminide with a second weld face 12 is held in a rotatable chuck 14 coupled to a drive means 16 via clutch means 18. Cooling means 19 is provided adjacent the first component comprising a manifold 20 with an array of discharge nozzles 22 in flow communication with a supply of liquid carbon dioxide (not shown) via an inlet 24.

Figure 2:
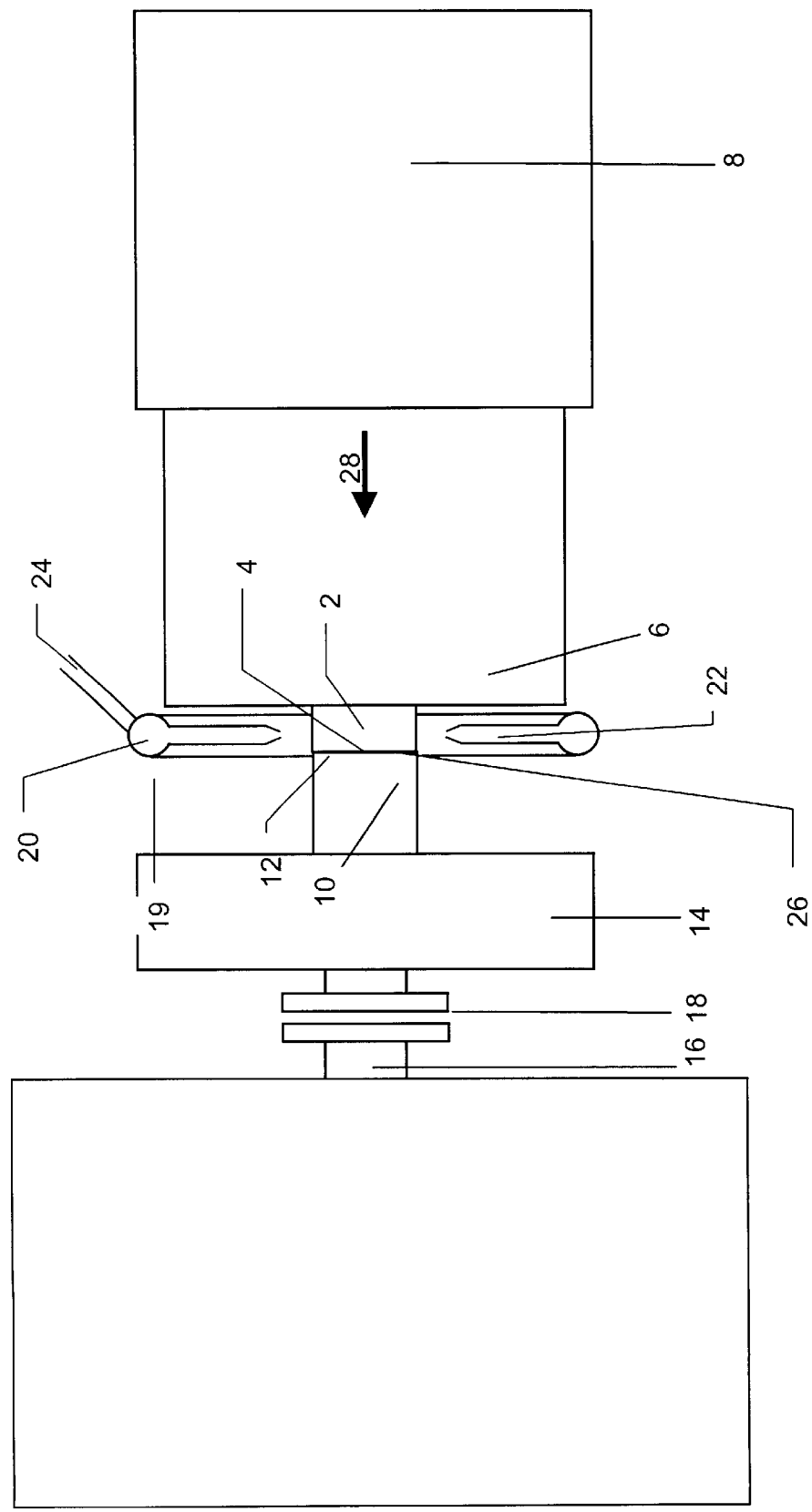
FIG. 2 shows a schematic of the friction welding device illustrated in FIG. 1 during operation.

The operation of the friction welding apparatus will now be described with reference to FIGS. 1 and 2. The rotatable chuck 14 is accelerated to a pre-set rotational speed by the drive means 16. On attaining the pre-set speed, the chuck 14 is de-coupled from the drive means 16 via the clutch 18. A weld interface 26 is formed by use of the hydraulic ram 8 to bring the first weld face 4 into contact with the second weld face 12. The ram 8 then maintains a steady forging load 28.

At the interface 26, the kinetic energy of the second component 10 is converted into heat energy via friction between the two weld faces 4, 12.

According to the invention at the same time a flow of coolant, supplied to the manifold 20 via the inlet 24, exits from the nozzles 22 striking the first component 2 adjacent the weld interface 26. By utilising a coolant capable of changes of phase at low temperatures the cooling means is better able to remove heat from the second component. Such a coolant shall henceforth be referred to as a refrigerant. The carbon dioxide boils as it strikes the first component 2, removing heat to create a temperature differential between the first and second component 2, 10. The titanium component 2 is maintained at a temperature below its melting point while the titanium aluminide component 10 is heated to a point at which it become usefully ductile, approximately 680° C. As the ductility of both components increase, the shear stress of each component 2, 10 falls below the shear stresses imposed by the rotation of the second component 10 relative to the first titanium component 2. Material then flows out from the interface 26 to form a surrounding 'upset', described in more detail later. This upset consumes material from the two components 2, 10, removing contamination from the interface 26.

As a result of the increased ductility of the components, the decontamination of the interface 18 and the forging load 26 being applied, a pressure weld forms between the two components.

Figure 3:
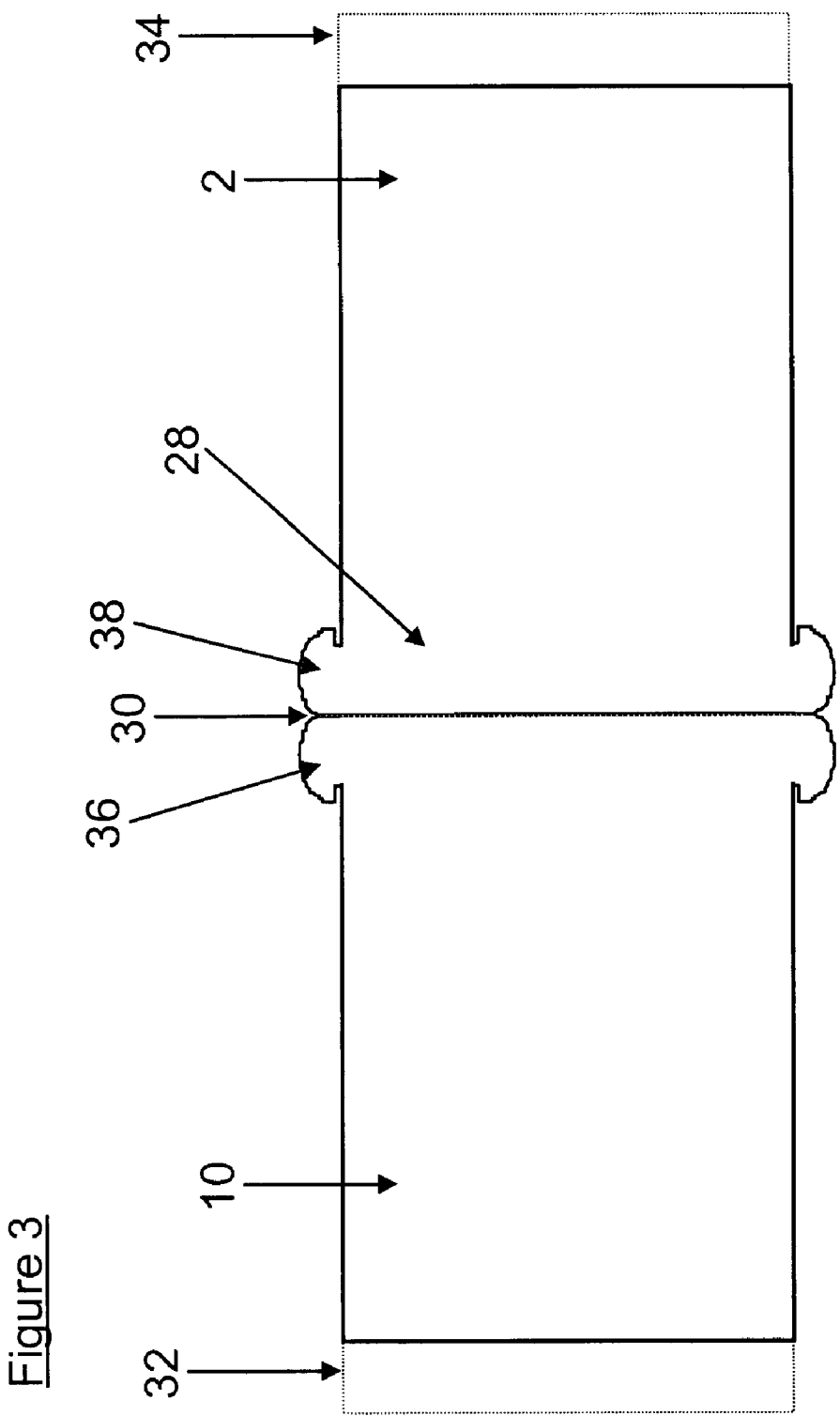
FIG. 3 shows a cross section of a friction weld between two components.

The structure of the weld will be better understood if reference is now made to FIG. 3 which shows a cross-section through the first and second component 2, 10 after joining. Because the ductilities of the components 2, 10 are substantially matched during the process by use of the cooling means 19, material 32, 34 has been consumed equally from either component 2, 10, to produce upset 36, 38.

Figure 4:
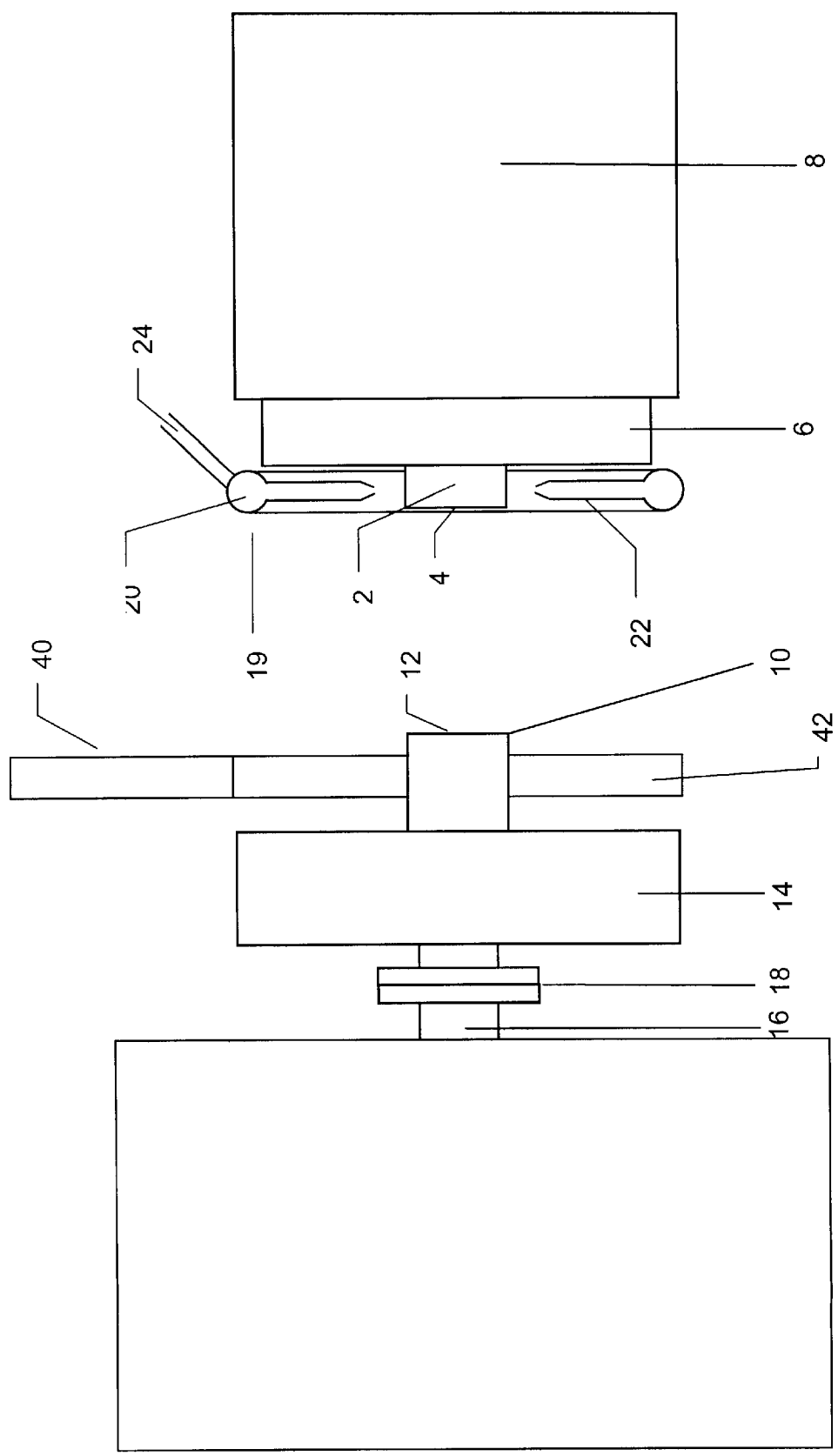
FIG. 4 shows a schematic of an inertia friction welding device similar to that of FIG. 1 but modified according to a further aspect of the present invention.

FIG. 4 shows in schematic form a further modification of the friction welding apparatus illustrated in FIG. 1 in which like parts carry the same reference numbers. In addition to the cooling means 19 there is provided heating means 40 adjacent the rotatable chuck 10 in the form of a 'pancake' type induction heater 42. The method of operation of the apparatus is the same as previously described with the addition that the heating means 40 is used to augment the temperature differential across the weld interface 26. In a preferred embodiment, the coolant used is an inert gas such as argon thereby shielding the second component 10 during operation of the heating means 40 as well as cooling the first component 2.

The friction welding process outlined above describes cooling the first component throughout the friction welding process. Alternatively the cooling means 19 can be used only to pre-cool the first component 2 before the weld interface 26 is formed, or in combination with cooling during the welding process. Similarly, the heating means 40, may be used only to pre-heat the second component 10 prior to formation of the weld interface in combination with heating during the welding process.

The use of liquid carbon dioxide to cool the first component 2 is not intended to limit the invention to the use of one particular coolant. Liquid carbon dioxide has been used as it is a known coolant means and off-the-shelf equipment exists for its use. However, it is recognised that other coolants may offer improved performance. One proposed coolant is liquid argon which has better shielding properties than carbon dioxide and may offer better quality welds as a result, albeit at greater cost. The use of helium is also proposed for similar reasons. Though the use of a refrigerant for cooling is preferred, it is not essential and should not be regarded as limiting the scope of the invention.

Finally, while the process above is configured to allow friction welding of dissimilar materials, in an alternate mode of operation the supply of coolant is used to bias the generation of upset by cooling a first component such that properties of the first component are less conducive to the formation of upset than those of a second component. This will be better understood if reference is now made to FIG. 5.

Figure 5:
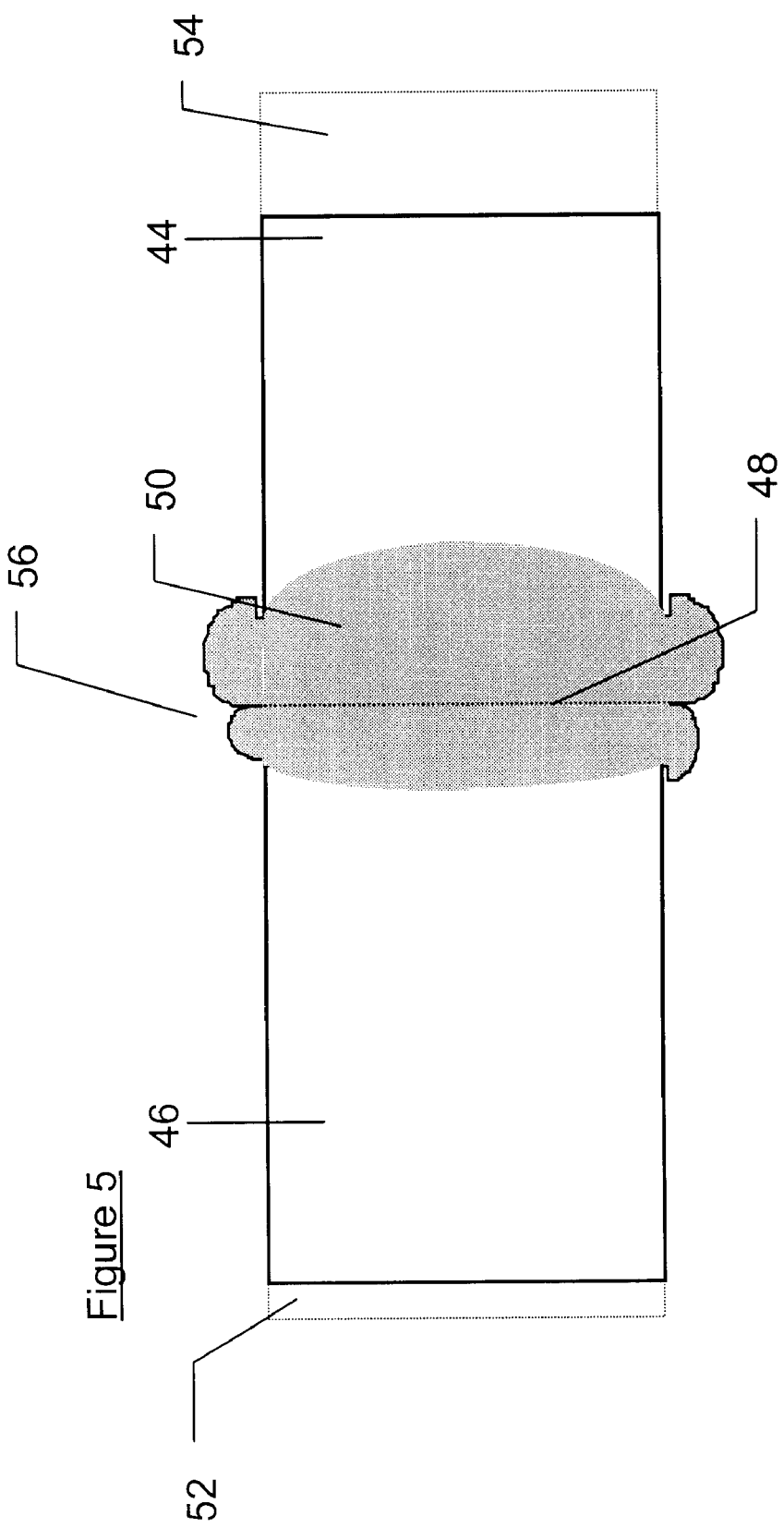
FIG. 5 shows a cross-section of a friction weld between two components.

FIG. 5 shows a cross-section of a first component 44 and a second component 46 that have been joined by a friction weld 48. The process used to form the weld is the same a previously described, however sufficient supply of coolant has been provided to the first component 44 as to bias the welding process in favour of the second component 46. Consequentially, a heat-effected zone 50 that surrounds the weld 48 extends further into the second component 46 than into the first component 44. Similarly, the weld has consumed more material 52 from the second component 46 than material 54 consumed from the first component 44. As a consequence, the upset 56 is also asymmetric. In this manner, friction welding between a first critical component and a second less critical component can be controlled to effect the less critical component more than the first.

This process is useful in the repair of components where the geometry of one component is more critical than the other or where the depth of the heat-effected zone 50 is more critical in one component than the other.

What is claimed is:

1. Friction welding apparatus for friction welding a first component and a second component together, the first component having a first weld face, the second component having a second weld face, the apparatus comprising means for bringing together the first weld face of the first component and the second weld face of the second component under a load to form a weld interface, means for simultaneously moving at least one of the components relative to the other to generate frictional heat at the weld interface, cooling means which acts directly upon only the first component to control temperatures in the first component adjacent the first weld face in order to control ductility of the first component adjacent the weld interface during friction welding, and heating means which acts directly upon only the first component to control temperatures in the second component adjacent the second weld face thereby controlling ductility of the second component adjacent the interface during friction welding.

2. Apparatus as claimed in claim 1 wherein the cooling means comprises means for directing a coolant at the first component adjacent the weld interface.

3. Apparatus as claimed in claim 2 wherein the coolant used is a refrigerant.

4. Apparatus as claimed in claim 2 wherein the coolant used is selected from the range comprising carbon dioxide, argon and helium.

5. Friction welding apparatus as claimed in claim 1 wherein the heating means comprises an induction heater.

6. A method of friction welding a first component and a second component together, the first component having a first weld face, the second component having a second weld face, comprising the steps of bringing together the first weld face of the first component and second weld face of the second component under a load to form a weld interface, simultaneously moving at least one of the components relative to the other to generate frictional heat at the weld interface, and cooling directly only the first component adjacent the first weld face thereby controlling the ductility of the first component adjacent the weld interface, and heating directly only the second component adjacent the second weld face thereby controlling the ductility of the second component adjacent the weld face.

7. A method of friction welding as claimed in claim 6 wherein the first component is cooled while at least one of the components is moved relative to the other.

8. A method of friction welding as claimed in claim 6 wherein the first component is cooled prior to formation of the weld interface.

9. A method of friction welding as claimed in claim 6 wherein the second component is heated adjacent the second weld face while at least one of the components is moved relative to the other.

10. A method of friction welding as claimed in claim 6 wherein the second component is heated prior to formation of the weld interface.

* * * * *